United States Patent
Taneda

(10) Patent No.: US 6,335,991 B1
(45) Date of Patent: *Jan. 1, 2002

(54) OPTICAL MODULATION APPARATUS AND OPTICAL MODULATION METHOD

(75) Inventor: Yasuhisa Taneda, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,266

(22) Filed: Nov. 24, 1997

(30) Foreign Application Priority Data

Nov. 26, 1996 (JP) .............................. 8-314480

(51) Int. Cl.$^7$ .............................. G02F 1/035
(52) U.S. Cl. .............................. 385/2; 385/39; 385/40; 359/237; 359/239
(58) Field of Search .............................. 385/2, 45, 39–44; 359/237–239

(56) References Cited

U.S. PATENT DOCUMENTS

| | | | | |
|---|---|---|---|---|
| 3,950,237 A | * | 4/1976 | Arawa et al. ............... | 204/195 |
| 4,346,537 A | * | 8/1982 | Masujima et al. ............ | 51/413 |
| 4,777,433 A | * | 10/1988 | Steele et al. .................. | 385/2 |
| 4,946,243 A | * | 8/1990 | Suzuki et al. ................. | 385/2 |
| 4,970,391 A | * | 11/1990 | Uber .......................... | 250/374 |
| 5,031,196 A | * | 7/1991 | Bahlmann et al. ............ | 375/94 |
| 5,258,869 A | * | 11/1993 | Nochebuena .............. | 359/278 |
| 5,359,449 A | * | 10/1994 | Nishimoto et al. ......... | 359/181 |
| 5,521,749 A | * | 5/1996 | Kawashima ................ | 359/325 |
| 5,590,145 A | * | 12/1996 | Nitta .......................... | 372/50 |
| 5,646,771 A | * | 7/1997 | Noda ......................... | 359/245 |

FOREIGN PATENT DOCUMENTS

| | | |
|---|---|---|
| JP | 3073916 | 3/1991 |
| JP | 5264934 | 10/1993 |

* cited by examiner

*Primary Examiner*—Ellen E. Kim
(74) *Attorney, Agent, or Firm*—Ostrolenk, Faber, Gerb & Soffen, LLP

(57) ABSTRACT

An optical modulation apparatus is provided with an optical modulator 2, a variable gain amplifying circuit 1 connected to this optical modulator 2, a detecting circuit 3 and a gain control circuit 4. A modulated input signal is entered into the variable gain amplifying circuit 1, and the variable gain amplifying circuit 1 amplifies this signal and delivers it to the optical modulator 2 as modulation drive signal. The detecting circuit 3 controls the variable gain amplifying circuit 1 on the basis of the detected signal. This optical modulation apparatus manifests steady optical modulation characteristics even if the amplitude of modulated input signals or ambient temperature varies.

9 Claims, 4 Drawing Sheets

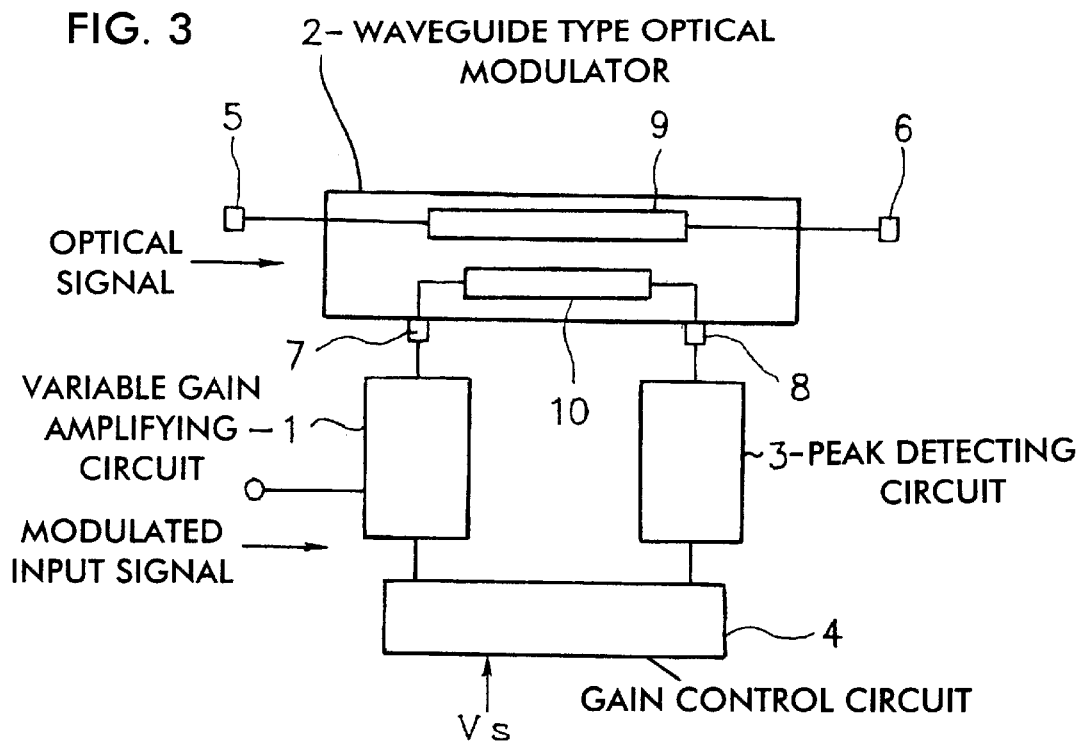
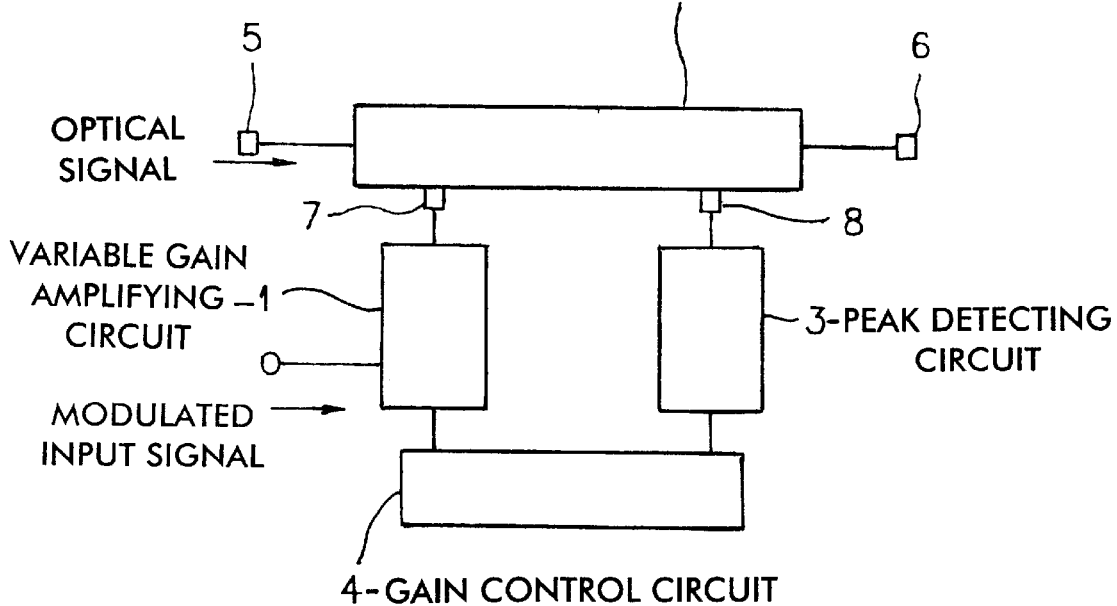

OPTICAL MODULATION APPARATUS AND OPTICAL MODULATION METHOD

BACKGROUND OF THE INVENTION

The present invention relates to an optical modulation apparatus and an optical modulation method, and more particularly to an optical modulation apparatus and an optical modulation method for controlling modulation drive signals.

Today, research on optical fiber communication systems is actively undertaken to increase the transmission capacity and the transmission distance. As means to raise the transmission speed and the elongation of the transmission distance in particular, waveguide type optical modulators are used. Among waveguide type optical modulators, ones using LiNbO3 for their substrates are well known, and they can be classified into three types: light intensity modulators, optical phase modulators and optical polarization modulators.

Next will be described an optical modulation circuit in which, out of these waveguide type optical modulators, an optical polarization modulator is used. In the optical polarization modulator, there are installed an optical input port to which optical signals are inputted and an optical output port from which polarization-modulated signals are outputted. The optical polarization modulator is also provided with an amplifying circuit for outputting modulation drive signals corresponding to polarization-modulated signals. These modulation drive signals are inputted to an electric signal input port of the optical polarization modulator and, traveling over a strip electrode line inside, outputted from an electric signal output. The modulation drive signals are terminated by a terminating circuit matched to the characteristic impedance of the strip electrode line.

However, optical modulation apparatuses according to the prior involve the problem that they are not disposed to cause the gain of said amplifying circuit to be controlled in any particular way. Therefore, if modulated input signals to the amplifying circuit vary in amplitude or its ambient temperature changes, the amplitude of modulation drive signals supplied from the amplifying circuit will vary. More specifically, a temperature rise would bring down the gain of the amplifying circuit. Where an optical polarization modulator is used as a waveguide type optical modulator, any variation in the amplitude of modulation drive signals would invite a change in the quantity of polarization modulation and a deterioration in the degree of polarization (referred to "DOP", hereinafter). Similarly, a light intensity type waveguide type optical modulator would deteriorate in quenching ratio.

SUMMARY OF THE INVENTION

An object of the present invention, attempted to solve the aforementioned problems, is to provide an optical modulation apparatus and an optical modulation method capable of achieving optical modulation characteristics against changes in the amplitude of modulated input signals or in ambient temperature.

An optical modulation apparatus according to the invention is provided with an optical modulator for modulating optical signals, a variable amplifying circuit for amplifying modulated input signals and supplying modulation drive signals to the optical modulator, and a detecting circuit for detecting the modulation drive signals supplied from the optical modulator. It may further be provided with a control circuit for controlling the variable amplifying circuit according to the modulation drive signals supplied by the detecting circuit. An optical modulation method according to the invention is a method to detect modulation drive signals supplied from an optical modulator and controlling an amplifying circuit for supplying the optical modulator with the modulation control signals on the basis of these signals.

The above-mentioned optical modulation apparatus and optical modulation method according to the invention manifest stable optical modulation characteristics.

BRIEF DESCRIPTION OF THE DRAWINGS

The above-stated and other objects, features and advantages of the present invention will become more apparent from the following detailed description when taken in conjunction with the accompanying drawings in which:

FIG. 3 is a block diagram illustrating an optical modulation apparatus according to the invention;

FIG. 4 is a block diagram illustrating another optical modulation apparatus in a different configuration;

DETAILED DESCRIPTION OF THE PREFERRED EMBODIMENTS

Figure 1:
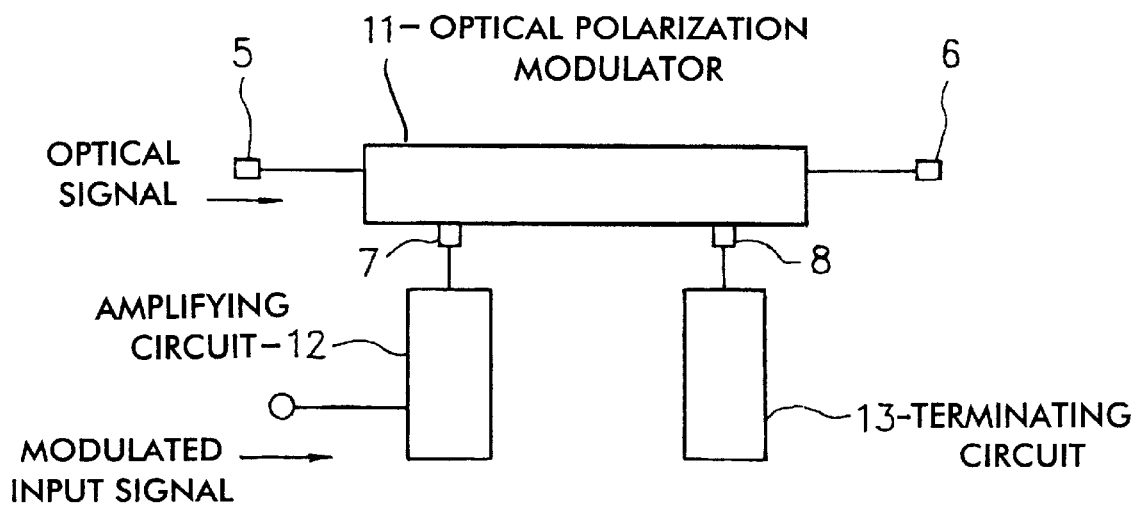
FIG. 1 is a block diagram illustrating an optical modulation apparatus according to the prior art.

First, an optical modulation apparatus according to the prior art will be briefly described with reference to FIG. 1. In an optical polarization modulator 11, an optical signal is inputted from an optical signal input port 5, and a modulated optical signal is outputted from an optical signal output port 6. An amplifying circuit 12 amplifies a modulated input signal, and delivers it from an electric signal input port 7 to the optical polarization modulator 11. This input signal is outputted from an electric signal output port 8, and terminated by a terminating circuit 13 matched to the characteristic impedance of a strip electrode line.

Figure 2:
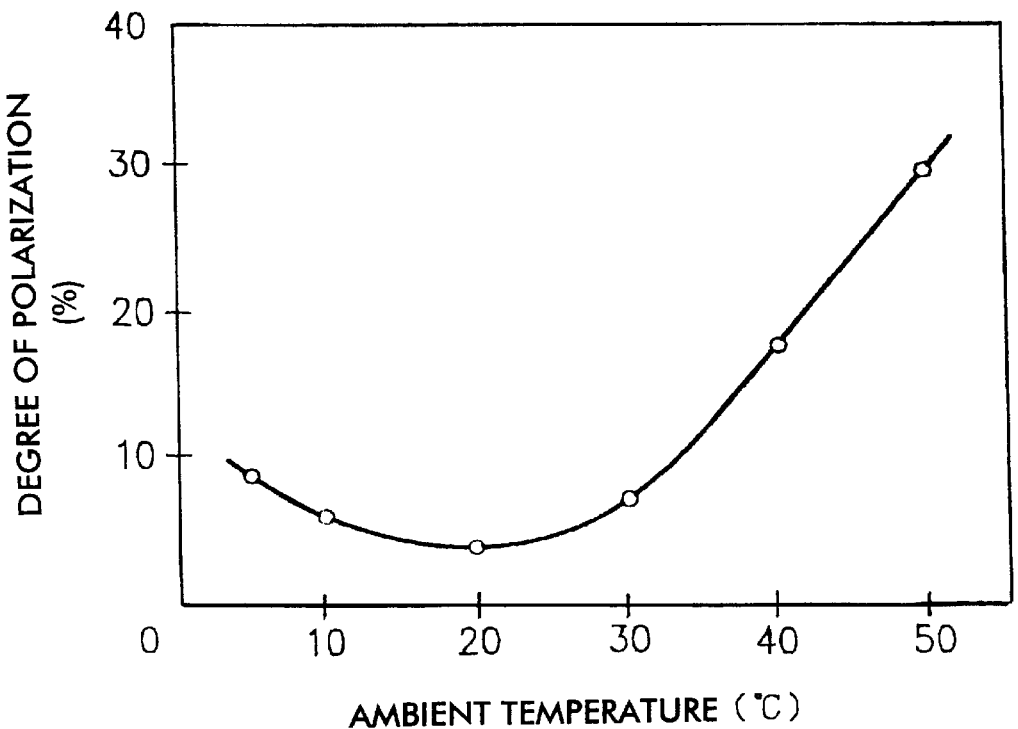
FIG. 2 is a graph showing the temperature-dependence of DOP of the optical modulation apparatus according to the prior art.

However, as illustrated in FIG. 1, the modulated input signal entered from the amplifying circuit 12 is subject to no particular control. Therefore, the dependence of polarization by the conventional optical polarization modulator 11 of FIG. 1 upon ambient temperature is such that, as shown in FIG. 2, DOP may vary by up to, for instance, 30%.

Next, the configuration of an optical modulation apparatus according to the present invention is illustrated in FIG. 3. Referring to FIG. 3, the optical modulation apparatus according to the invention has a waveguide type optical modulator 2 for modulating optical signals and a variable gain amplifying circuit 1 for supplying modulation drive signals to the waveguide type optical modulator 2. The waveguide type optical modulator 2, composed of a traveling-wave electrode structure in which optical signals and modulation drive signals travel in the same direction, has an optical waveguide 9 and a strip electrode line 10. An optical signal travels from an optical signal input port 5 over the optical waveguide 9 and is supplied to an optical signal output port 6. A modulating drive signal is entered from the variable gain amplifying circuit 1 into an electric signal input port 7, and travels over the strip electrode line 10 to be supplied to an electric signal output port 8.

The variable gain amplifying circuit 1 amplifies the modulated input signal, which is a clock signal, and supplies it to the electric signal input port as modulation drive signal. To the electric signal output port 8 is connected a peak detecting circuit 3. This peak detecting circuit 3 detects, and supplies to a gain control circuit 4, a voltage signal corresponding to the amplitude of the modulation drive signal having traveled over the strip electrode line 10. The gain control circuit 4 controls the gain of the variable gain amplifying circuit 1 so that said voltage signal be identical with a preset reference voltage Vs. This reference voltage Vs is a voltage to generate the currently set level of modulation.

Incidentally, for the waveguide optical modulator 2, there is available a light intensity modulator, an optical phase modulator or an optical polarization modulator, differentiated from each other by the structure of the waveguide or the incidence structure for optical signals, and the present invention is adaptable to any of them.

Next, the operation of this optical modulation apparatus will be described. A modulation drive signal brought to incidence from the variable gain amplifying circuit 1 upon the waveguide type optical modulator 2 is detected by a peak detecting circuit 3 connected to the electric signal output port 8. This peak detecting circuit 3 detects the peak voltage of demodulation drive signals. The gain control circuit 4 compares the peak voltage with a prescribed reference voltage Vs, and applies feedback control on the variable gain amplifying circuit 1 so as to equalize the peak voltage to the reference voltage Vs. For this reason, the variable gain amplifying circuit 1 can always feed the waveguide type optical modulator 2 with modulation drive signals of a constant amplitude. As a result, even if the variable gain amplifying circuit 1 is affected by any change in ambient conditions including temperature, or if modulation drive signals fluctuate in amplitude, this waveguide type optical modulator 2 can manifest steady optical modulation characteristics.

An instance in which an optical polarization modulator is used as waveguide type optical modulator 2 of an optical modulation apparatus according to the present invention is illustrated in FIG. 4. Here, the clock frequency of modulation input signals entered into the variable gain amplifying circuit 1 is 5 GHz. As optical polarization modulator 11 to modulate the state of polarization of optical signals, including digital data, there is used a LiNbO3 waveguide type optical modulator. Its 2Vπ voltage amplitude is 8.2 Vpp at 5 GHz, while the transmission loss of the strip electrode line is −2 dB at 5 GHz. The variable gain amplifying circuit 1, using a GaAs field effect transistor, can vary the gain from −30 dB to +20 dB with its gate voltage, and its saturation output power is +23 dBm. The peak detecting circuit 3, consisting of a silicon transistor, has a detection efficiency of 60% and a reflection loss of −16 dB at a frequency of 5 GHz. The gain control circuit 4, using an operational amplifier, controls said gate voltage so that the output amplitude of the variable gain amplifying circuit 1 be always 8.2 Vpp.

Figure 5:
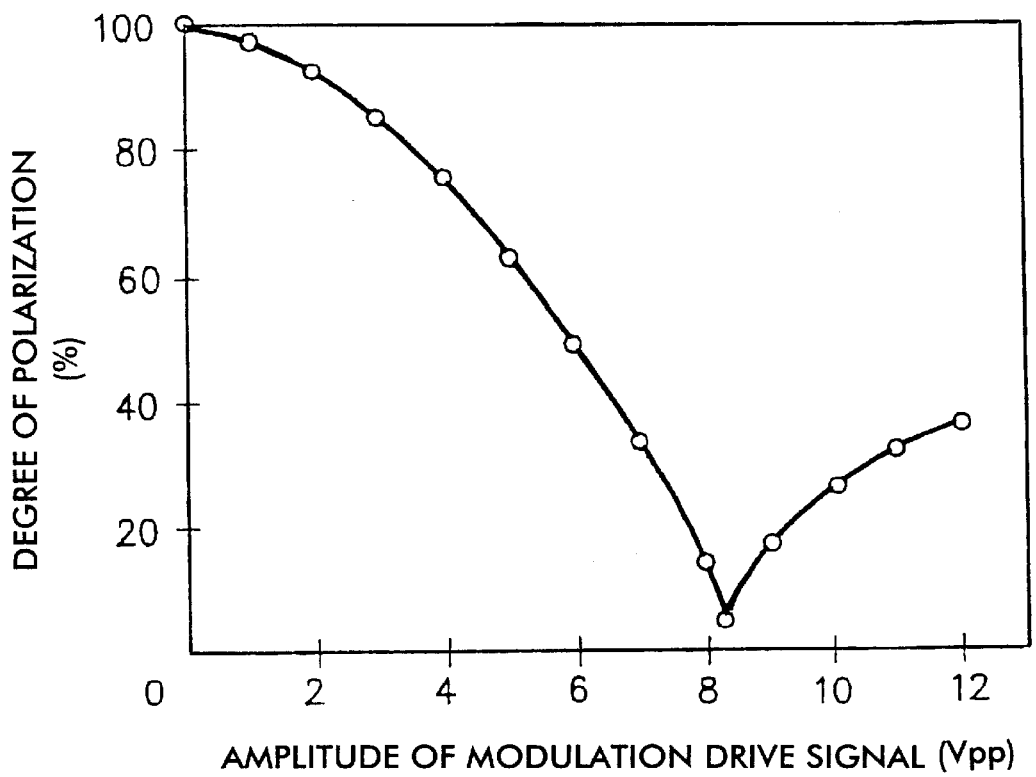
FIG. 5 is a graph showing the relationship between the amplitude of modulation drive signals and DOP in the optical modulation apparatus according to the invention illustrated in FIG. 4.
Figure 6:
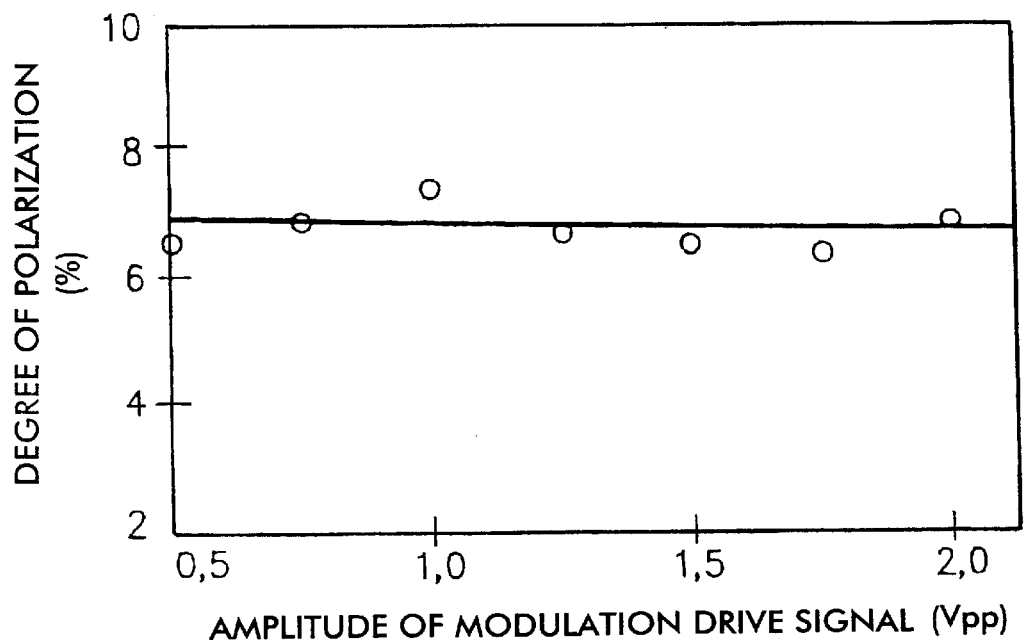
FIG. 6 is a graph showing the relationship between the amplitude of modulated input electric signals and DOP in the same optical modulation apparatus according to the invention.
Figure 7:
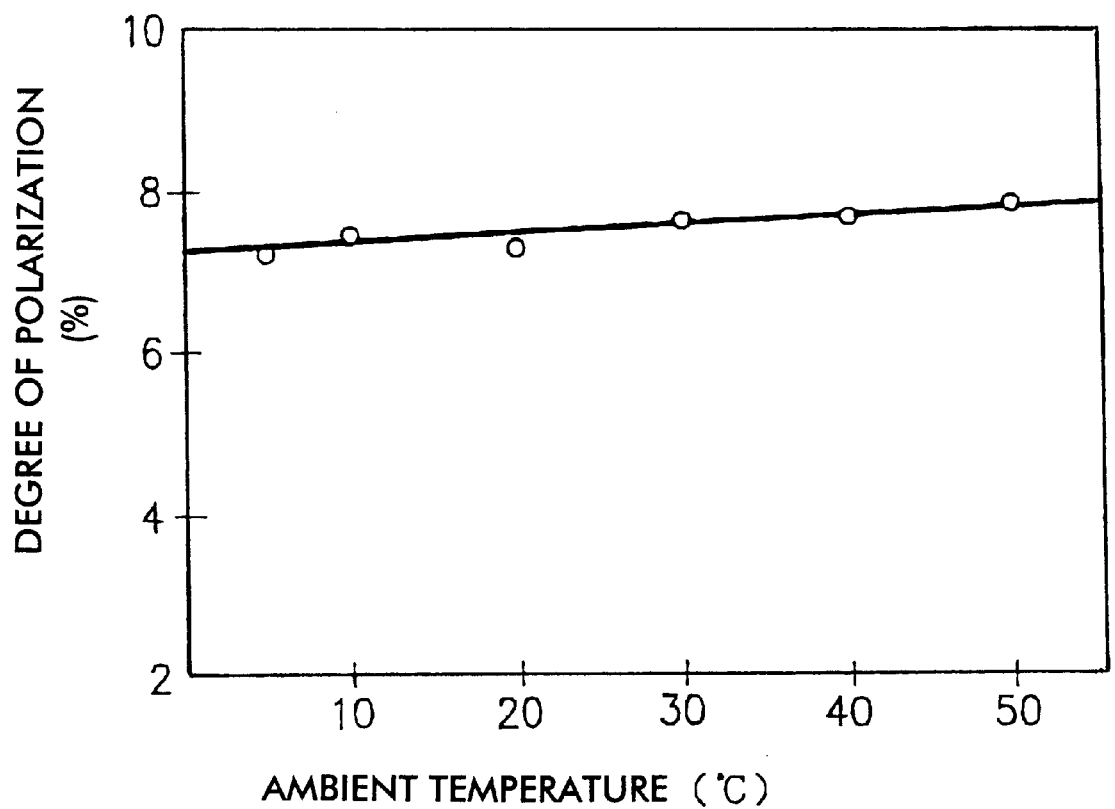
FIG. 7 is a graph showing the temperature-dependence of DOP of the same optical modulation apparatus according to the invention.

Next are shown the measurements of the optical modulation apparatus illustrated in FIG. 4. FIG. 5 shows the basic characteristics of DOP of the optical polarization modulator 11 used here vis-a-vis the amplitude of the modulation drive signal. The vertical axis of the graph represents DOP of the optical modulator, while the horizontal axis represents the peak-to-peak amplitude of the modulation drive signal supplied by the variable gain amplifying circuit 1. Thus, this modulation drive signal varies in a sine curve. DOP varies as the amplitude of the modulation drive signal supplied by the variable gain amplifying circuit 1 varies under the effect of ambient temperature variation. FIG. 5 shows the minimum DOP of 5% at 8.2 Vpp. FIG. 6 indicates that, even where the amplitude of the modulated input signal varies between 0.5 Vpp and 2.0 Vpp, DOP is kept at or below 7%. FIG. 7 shows the relationship between ambient temperature and DOP when the ambient temperature is varied from 5° C. to 50° C. under feedback control, indicating that the variation of DOP is always kept from exceeding 8%.

As is evident from the above-cited graphs, an optical modulation apparatus according to the invention can achieve steady optical modulation characteristics against fluctuations in the amplitude of modulated input signals or in ambient temperature.

Incidentally, in the configurations illustrated in FIGS. 3 and 4, the peak detecting circuit 3 detects the peak values of signals supplied from the electric signal output port 8, but the mean value, instead of the peak value, may as well be detected.

While the present invention has been described in connection with certain preferred embodiments thereof, it is to be understood that the subject matter encompassed by the present invention is not limited to these specific embodiments. Instead, it is intended to include all alternatives, modifications and equivalents that can be included within the true spirit and scope of the following claims.

What is claimed is:

1. An optical modulation apparatus provided with:
    an optical modulator for modulating an optical signal, said optical modulator having an input optical port, an output optical port, an electrical input port, an electrical output port and an electrical path extending from the input electrical port to the output electrical port;
    an amplifying circuit for amplifying a modulation input electrical signal to supply the amplified modulation input electrical signal as a modulation drive electrical signal to the optical and electrical input ports of said optical modulator, whereby said optical modulator modulates the optical signal according to the modulation drive electrical signal and outputs the modulated optical signal at the output optical port and outputs an output modulation drive electrical signal at the electrical output port thereof;
    a detecting circuit for detecting the output modulation drive electrical signal output from the electrical output port of said optical modulator to output a detection electrical signal; and
    a control circuit for controlling said amplifying circuit according to the detection electrical signal output by said detecting circuit.

2. An optical modulation apparatus as claimed in claim 1, wherein said optical modulator is a waveguide type optical modulator provided with an optical waveguide and electrodes.

3. An optical modulation apparatus as claimed in claim 1, wherein said optical modulator is one optical modulator selected out of an optical polarization modulator, a light intensity modulator and an optical phase modulator.

4. An optical modulation apparatus as claimed in claim 1, wherein said detecting circuit is a signal peak value detecting circuit.

5. An optical modulation apparatus as claimed in claim 1, wherein said detecting circuit is a signal mean value detecting circuit.

6. An optical modulation apparatus as claimed in claim 1, wherein said control circuit controls the gain of said amplifying circuit so that the detection by said detecting circuit be equal to a prescribed value.

7. An optical modulation method comprising:
    detecting an output modulation drive electrical signal supplied from an output port of an optical modulator; and
    controlling an amplifying circuit for supplying an input port of the optical modulator with an input modulation drive electrical signal on the basis of the detected output modulation drive electrical signal, wherein the optical modulator modulates an optical signal according to the detected output modulation drive electrical signal.

8. An optical modulation method as claimed in claim 7, wherein the modulation drive electrical signals supplied from the optical modulator are detected, and the gain of the amplifying circuit is controlled so as to equalize the amplitude of modulation drive electrical signals to a reference voltage.

9. An optical modulation method as claimed in claim 7, wherein said optical modulator is a waveguide type optical modulator provided with an optical waveguide and electrodes.

* * * * *